Jan. 12, 1954  H. C. ROWE ET AL  2,665,544
HOUR CHIMING CLOCK

Filed March 7, 1950  6 Sheets-Sheet 1

INVENTORS.
Harry C. Rowe
BY Elmer H. Bladh
Wood, Arey, Herron & Evans
ATTORNEYS.

Jan. 12, 1954

H. C. ROWE ET AL 2,665,544

HOUR CHIMING CLOCK

Filed March 7, 1950

INVENTORS.
Harry C. Rowe
Elmer H. B Cadh
BY Wood, Arey, Herron & Evans
ATTORNEYS.

Jan. 12, 1954

H. C. ROWE ET AL 2,665,544

HOUR CHIMING CLOCK

Filed March 7, 1950

INVENTORS.
Harry C. Rowe
BY Elmer H. Bladh
Wood, Arey, Herron & Evans
ATTORNEYS.

INVENTORS
Harry C. Rowe
Elmer H. Bladh
BY
Wood, Arey, Herron & Evans
ATTORNEYS.

Jan. 12, 1954

H. C. ROWE ET AL 2,665,544

HOUR CHIMING CLOCK

Filed March 7, 1950

INVENTORS.
Harry C. Rowe
BY Elmer H. Black
Wood, Arey, Herron & Evans
ATTORNEYS.

Patented Jan. 12, 1954

2,665,544

UNITED STATES PATENT OFFICE 2,665,544

HOUR CHIMING CLOCK

Harry C. Rowe, Chicago, Ill., and Elmer H. Bladh, Cincinnati, Ohio, assignors to Nutone, Inc., Cincinnati, Ohio, a corporation of New York Application March 7, 1950, Serial No. 148,168

7 Claims. (Cl. 58—38)

This invention relates to a chiming and hour striking clock and particularly to an apparatus for sounding the chimes and hour strokes electrically, as distinguished from mechanical apparatus of this nature. The apparatus is intended principally for the production of self-contained electric chiming clocks of moderate size, for example, ornamental mantel clocks, suitable for household use and arranged to signal the hours and to chime a series of harmonious notes at the hour and at designated times between the hours.

Striking and chiming clocks in the past have been rather intricate and expensive since they require, in addition to the clock mechanism, some form of computing apparatus arranged to regulate the number of hour and chime strokes progressively, and also a power device under control of the computing apparatus to perform the actual striking and chiming operations. Furthermore, the chimes, bells and other signal devices customarily used have been heavy and bulky, making it difficult to produce an attractive, light weight mantel clock with full sized chimes mounted within the clock case. For this reason, chiming apparatus of the present character has been limited in most cases to grandfather clocks or to rather large, cumbersome mantel clocks, often with the chimes mounted outside the clock case.

One of the primary objects of the present invention has been to provide a reliable inexpensive electric chiming clock by utilizing simple and compact electrical switching apparatus for regulating the hour strokes and chime sequence, cooperating with a compact arrangement of solenoid energized chimes which are capable of producing chime notes of volume and tone quality equal to or surpassing large sized mechanical chimes but which are sufficiently compact in size to be mounted in the clock casing itself. By utilizing electrical regulating devices and electrically operated chimes, the parts may be made considerably smaller and lighter than mechanical devices without any sacrifice in performance or durability.

Essentially, the improved clock embodies an electrical clock mechanism of standard construction, mounted within a case and in driving connection with a pair of rotary chime regulating switches, one switch constituting a stroke counter and the other a cycle control switch operable to place the chimes in operation at designated signal periods. A third chime or signal energizing switch is regulated by these clock driven switches and includes a rotary contact finger driven by an independent electric motor. The contact finger is arranged to sweep over a series of contacts which are electrically connected to the chime solenoids, thereby to strike the hours and sound the chimes upon rotation of the contact finger by the switch motor. The switch motor is connected electrically to the cycle control switch and is arranged to be energized at timed intervals as the cycle control switch is advanced by the clock movement. The contacts of the chime energizing switch represent individual hour strokes and chiming strokes and are energized for hour indication by the counting apparatus; the number of contacts energized representing the number of strokes to be sounded.

The chimes are mounted as a unit at the rear of the clock casing and consist essentially of tone bars for the several notes, each bar having an individual striker solenoid and a corresponding resonator tube. The tone bars and tubes are arranged to produce musical notes of clear resonant tone quality upon actuation of the solenoids. In sounding the chime sequence, the solenoids are energized selectively by the chime energizing switch in predetermined order; but in striking the hour, one of the chimes is sounded from one to twelve times according to the hour. In the preferred embodiment of the invention, as disclosed in the specification and drawings, the apparatus is arranged to produce on the half hours a musical chime consisting of four notes, and to sound on the hour, a chime consisting of eight notes followed by a series of strokes indicating the time.

One of the important features of the present structure is the independent mounting of the clock mechanism and chime control apparatus as one unit at the forward side of the clock case and the mounting of the chime assembly as another unit at the rearward side of the case, whereby either unit may be detached conveniently for replacement or repairs after prolonged use. Another important feature is the provision of a self-contained chime energizing switch which constitutes an enclosed unit for the protection of its contacts and moving parts against fouling by dust and dirt. Since this particular switch is subject to hard service and forms a critical part of the apparatus, it is constructed ruggedly for prolonged trouble-free service. However, it is likely to show signs of wear earlier than other parts of the apparatus because of the increased amount of work performed; consequently, it is arranged and installed upon the clock assembly for convenient replacement as a sealed unit without disturbing the other parts or the electrical wiring interconnecting the various parts.

The four and eight note chime sequences and the hour strokes are converted into electrical impulses by the chime energizing switch and sent to the chime solenoids in predetermined sequence during rotation of the contact finger. The housing of the switch incorporates the above noted contacts which are energized by the stroke counting apparatus for the number of single chime notes for hour indication and respective sets of contacts for the chime sequences; the contact blade being arranged to sweep successively over the chime contacts, then to engage successively the striking contacts. The contact finger is arranged to sound the hour chimes and strike the hour upon one partial turn within the switch housing, and to strike the half-hour chime during the remaining partial turn, the various contacts being located in a circle corresponding to the sweep of the contact finger. Upon completing the hour chime and strike the blade is brought to a stop in position to sound the half-hour chimes the next time the switch motor is energized by the cycle control switch. In order to stop the finger at these two positions, the energizing switch includes its own control circuit which deenergizes the motor after completing the hour stroke. Here the finger remains stationary until the clock driven cycle control switch next energizes the motor for the half-hour chime sequence. Upon restarting the motor, a second control circuit is established within the switch which completes the motor circuit until the finger again swings around to the hour position to be deenergized automatically.

In addition to the foregoing advantages, the improved apparatus permits more convenient resetting of the clock since it is unnecessary to pause at each hour and half hour to permit the clock to strike in order to keep the striking mechanism in step with the clock movement. The gears of the chime control switches are meshed permanently with the clock gear train such that during resetting of the clock, the counting and cycle control switches both advance with the clock gear train; but it is not necessary for the chime energizing switch to operate through its cycle during such advancement. In other words, the chime energizing switch is mechanically independent of its control switches and responds automatically to the new setting to strike the hour correctly after resetting.

Further objects have been to provide in conjunction with the chime control switches an arrangement for silencing the chimes automatically during certain hours of the night; to provide a simple electrical arrangement for regulating the volume of the chimes; and also to provide a novel arrangement of tone bars which are disposed in overlapping relationship with one another and related to the respective resonator tubes in such manner that tone bars of substantial length may be fitted into a relatively small space. Such a tone bar arrangement produces notes of lower scale and more pleasing sound quality and at the same time the assembly is sufficiently compact for installation in an attractive mantel clock case.

Further advantages of the invention and the various modifications of which it is susceptible will be apparent to those skilled in the art from the following detailed description in conjunction with the drawings.

*General structure and operation*

Figure 3:
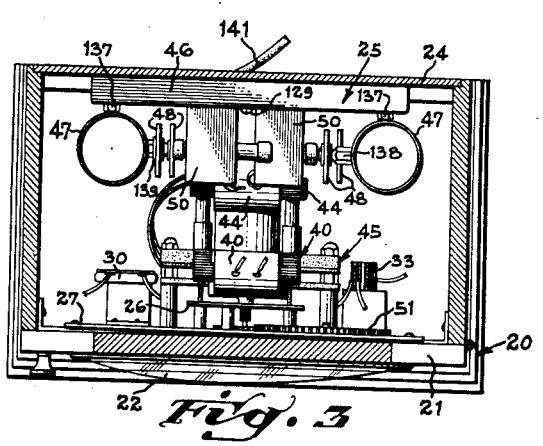
Figure 3 is a cross sectional view taken on line 3—3, Figure 1, illustrating generally the relationship of the clock movement and chime assembly with respect to the case.

Described generally with reference to Figures 1 to 5 inclusive, the chiming clock is housed within the case 20 which includes at its forward side a hinged door 21 having a window 22 of the usual construction for viewing the clock face 23. The rear side of the casing has a removable panel 24 preferably attached by screws for access to the chime unit 25, which may be removed as an assembly from the casing when the door is removed. The clock is driven by a gear train hereinafter described, which is located between a plate 26 and a main mounting plate 27, plate 27 being secured within the forward side of the casing. The striking and chiming control apparatus also is mounted upon the plate 27 and connected by gears to the gear train of the clock movement, as hereinafter described in detail. The electrical impulses from the striking and chiming apparatus are conducted by a system of electrical cables to the chime unit 25 to energize the solenoids in accordance with the time registered by the clock. In order to facilitate assembly and to permit the chime unit to be removed, these cables lead from the clock movement to the separable junction block generally indicated at 28 in Figures 4, 6, 7 and 8.

Figure 1:
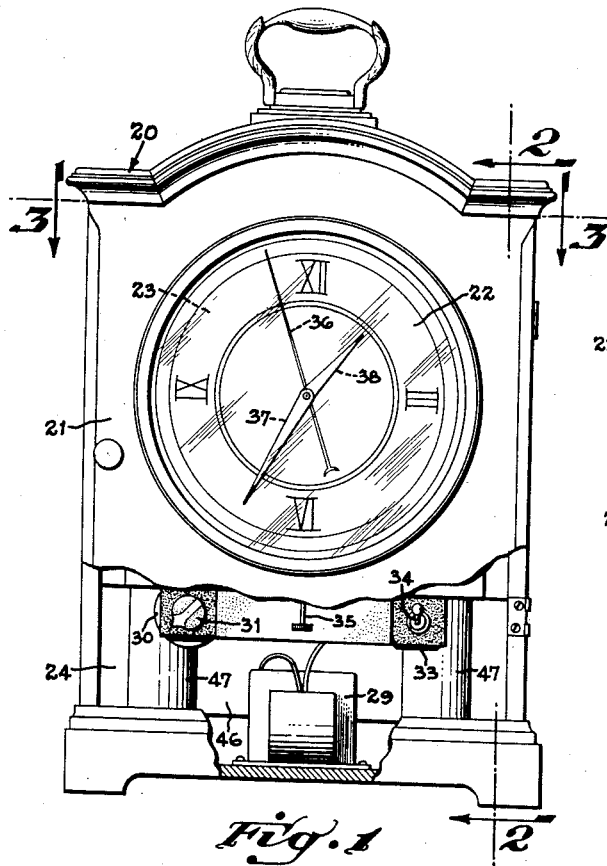
Figure 1 is a front elevation partially broken away, illustrating a mantel clock equipped with the present apparatus.
Figure 2:
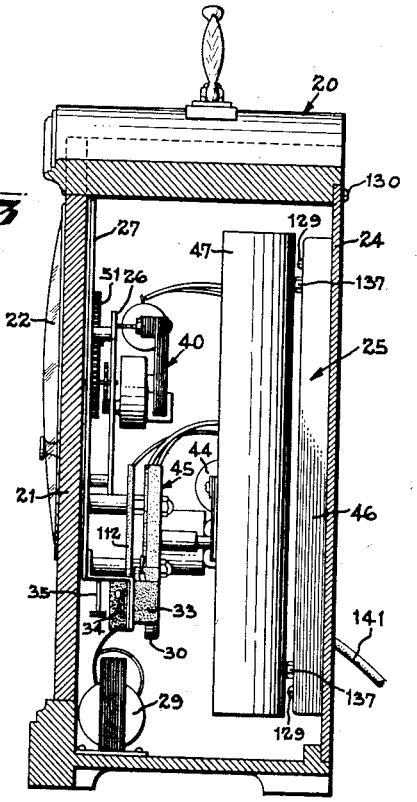
Figure 2 is a longitudinal sectional view taken on line 2—2, Figure 1, further illustrating the assembly.
Figure 5:
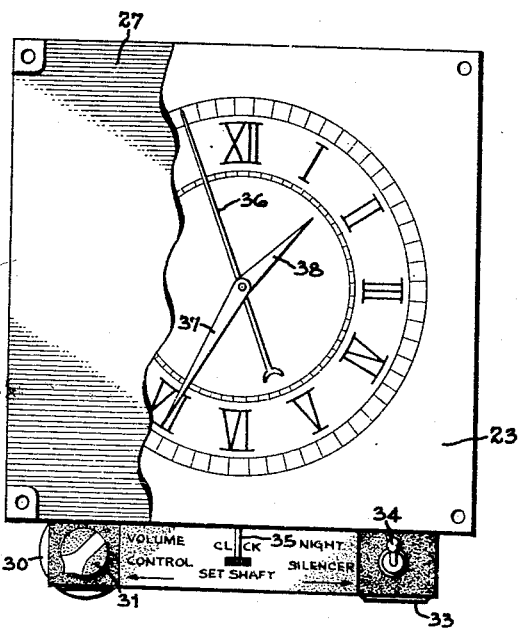
Figure 5 is a front elevation of the clock movement including the chime control apparatus removed from the case.
Figure 8:
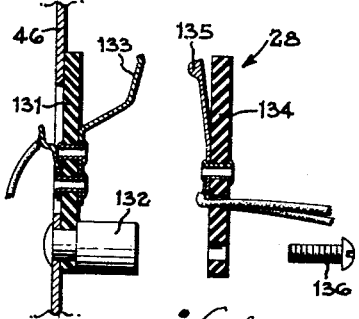
Figure 8 is a sectional exploded view of the junction block.

The clock movement and the chime energizing switch are driven independently by synchronous clock motors which are energized by a transformer 29 mounted within the lower portion of the casing 20, as shown in Figures 1 and 2. In addition, the apparatus includes a volume control rheostat 30 having a knob 31 for regulating the chime volume and a night silence switch 33 for muting the chimes during certain hours of the night. This switch is operated by the toggle lever 34. The clock movement is provided with the usual manually operated stem 35 for resetting purposes. The volume control knob 31, muting switch lever 34 and stem 35 are located below the face of the clock and are accessible by opening the door 21. As shown in Figures 1 and 5, the clock movement includes the usual second hand 36, minute hand 37 and hour hand 38 and the usual friction drive is provided between the clock motor and the gear train to permit resetting. The gears for the striking apparatus are in permanent mesh with the clock gears in such a way that the striking apparatus is reset concurrently with the adjustment of the hands; consequently, the striking apparatus is synchronized permanently in hour striking relationship with the clock movement.

Figure 9:
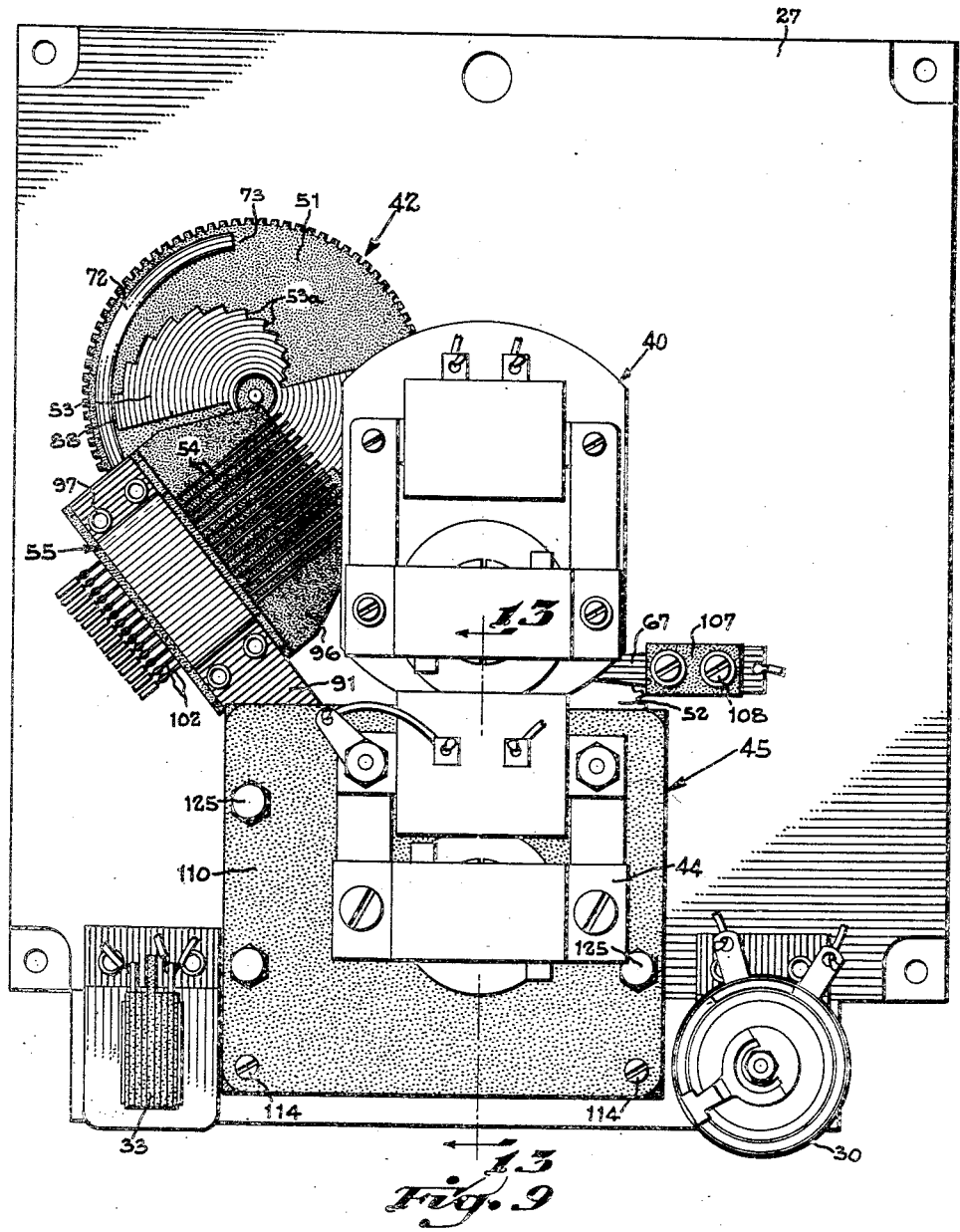
Figure 9 is an enlarged view of the clock assembly as viewed from the side opposite to that shown in Figure 5 to illustrate the general arrangement of the clock motor and chime controlling apparatus.
Figure 10:
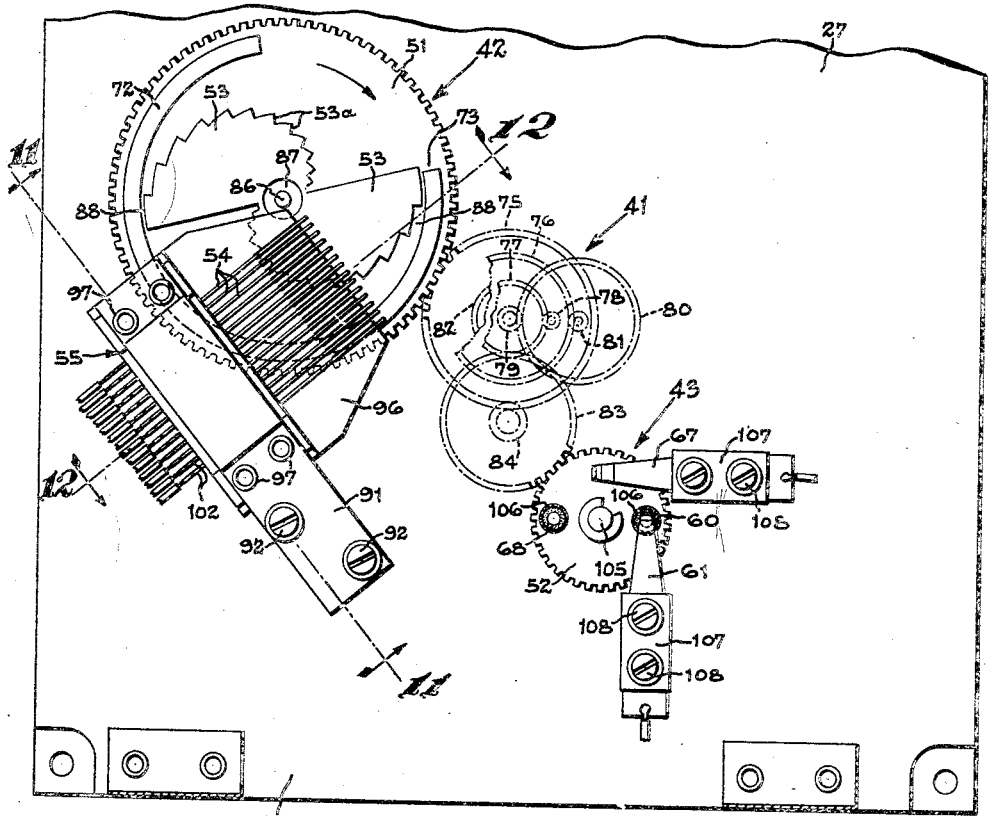
Figure 10 is a view similar to Figure 9 with certain parts removed to illustrate more completely the electrical switching apparatus which is driven by the clock gear train for operating the chimes.

Generally described with reference to Figures 9 and 10, the clock motor 40 drives the clock gear train generally indicated at 41 which provides the appropriate speed reduction for the second, minute and hour hands. The minute and hour hands are mounted upon telescopically arranged sleeves and the second hand is mounted upon a spindle within the inside sleeve in the usual manner. These sleeves and spindle (not shown) carry upon their inner ends the respective gears of the train as hereinafter described.

This gear train drives the stroke counter switch indicated generally at 42 and the cycle control device indicated generally at 43. These respective devices in turn regulate the operation of synchronous motor 44 forming a part of the rotary chime energizing switch 45. The stroke counter, cycle control device and chime energizing switches form the main components of the chime control apparatus. The chime energizing switch includes a series of stationary contacts connected electrically to the solenoid operated chimes which strike the hours from one to twelve upon operation of the motor 44 upon the hour. This switch further includes two sets of chiming contacts interconnected with the chime solenoids and arranged in the present instance to sound a chime sequence of four notes at each half hour and to produce a second sequence of eight notes before the hourly strokes. The eight note sequence consists of a combination of the four basic notes, arranged preferably in a progression known in the art as a Westminster chime.

Motor 44, which drives the chime energizing switch, includes a built-in gear reduction unit suitable to rotate a contact blade at a slow rate of movement over its contacts. On the half hour the blade executes a partial turn to energize the four chime notes and then stops. The turn is completed on the hour to sound the eight note chime and then to strike the number of hours. The number of strokes on the hour is determined by the stroke counting switch 42 driven by the clock movement and connected electrically to the contacts of the chime energizing switch 45. The arrangement is such that the striking contacts are energized in accordance with the number of hours to be struck ranging from one to twelve. Upon each rotation of the contact blade, all twelve of the striking contacts are contacted by the blade; however, only those contacts which are energized by the stroke counter cause the chime solenoid to be energized. Therefore, the number of strokes depends upon the number of contacts energized by the counter 42 which, of course, corresponds to the hour reading of the clock.

The striking and chiming motor 44 is energized by the cycle control unit 43 which is arranged to energize the motor 44 upon each hour and half hour. The cycle control unit in general constitutes a gear having contacts which complete the circuit to the motor 44 at each half hour and hour. The rotary chime energizing switch 45 includes holding contacts which determine the extent of rotation of the rotary blade, causing the blade to execute a partial turn and stop on the half hour and causing it to complete the turn on the hour. Thus, the striking and chiming switch is self-controlled once the cycle is initiated by the cycle control unit 43.

Figure 4:
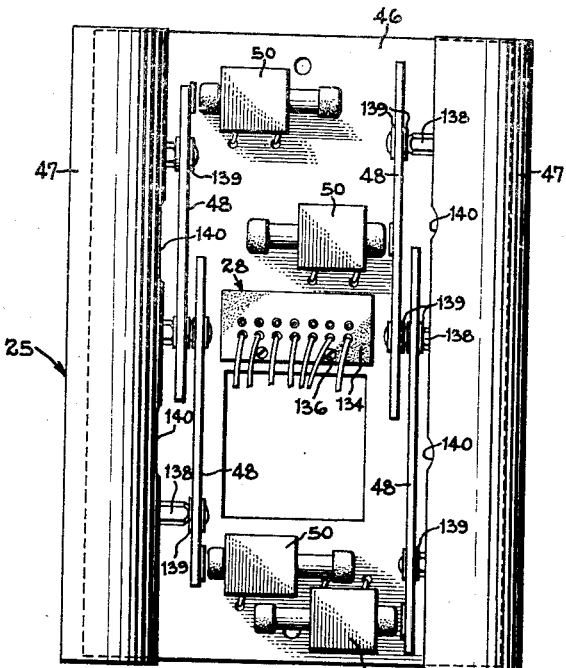
Figure 4 is a rear elevation illustrating the chime unit removed from the clock case.
Figure 6:
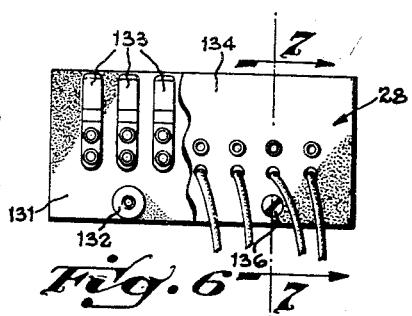
Figure 6 is an enlarged front view partially broken away, showing the junction block which provides a separable connector for the electrical wires extending from the clock to the chime unit to facilitate assembly or removal of the chime unit relative to the case.
Figure 7:
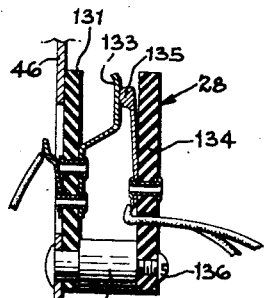
Figure 7 is a sectional view taken on line 7—7, Figure 6 further detailing the junction block.

The chime assembly 25 is best illustrated in Figures 2, 3 and 4 and constitutes in general a mounting plate 46, a pair of resonator tubes 47—47 which are divided intermediate their length into two sections to provide a resonator chamber for each tone bar. A respective tone bar 48 is mounted adjacent each resonator and a respective striker solenoid 50 is mounted adjacent each tone bar. The solenoids are connected electrically to the junction block 28 and from the junction block the wires extend into the clock case for electrical connection with the transformer and switching apparatus above described. As previously noted, the junction block is separable to permit the chime unit to be detached conveniently. The electrical circuit and structural details of the various components above outlined are disclosed in greater detail hereinafter.

Figure 19:
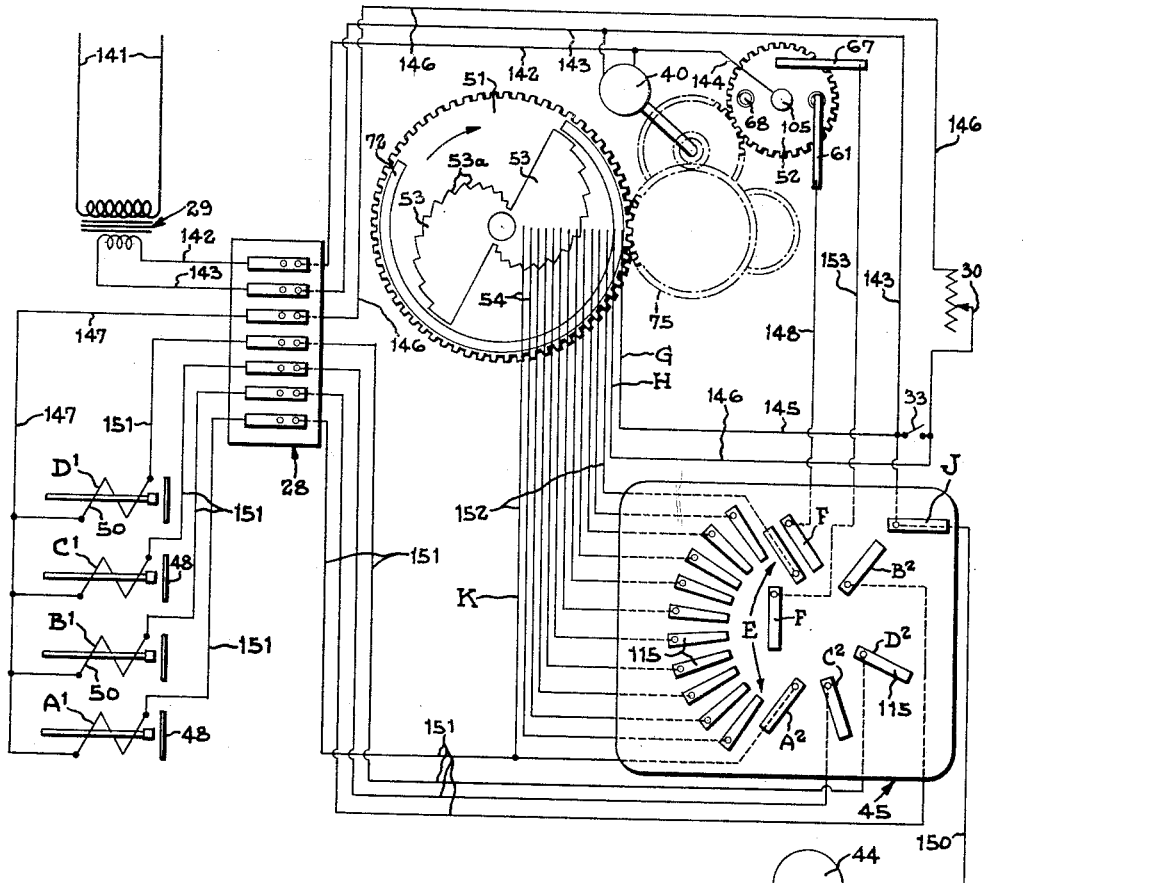
Figure 19 is a diagrammatic view illustrating the electrical system for operating the chimes.

In the following description of operation, the term "chiming" refers to the sounding of the chime sequence of four or eight notes at the half-hour and hour and the word "striking" refers to the individual strokes of one of the chimes to indicate the hour from one to twelve. As shown in Figures 9 and 10, the stroke counter 42 includes a gear 51 meshing with one of the gears of the clock train. The gear 52 of the cycle control unit 43 is in mesh with another gear of the clock train. The stroke counter gear 51 makes one revolution every twenty-four hours and the cycle gear 52 makes one revolution every two hours. The stroke counter gear includes a pair of stepped metallic conducting areas indicated at 53—53, one for each twelve hours, which are contacted by the individual collector fingers 54 of the comb or wiper unit 55. The conducting areas are provided with steps 53a arranged to contact the individual collector fingers 54 and progressively interconnect them across the conducting area 53, as shown. These fingers are in electrical connection individually with the contact buttons 56 of the chime energizing switch, as shown in Figure 19.

In the chime energizing switch (Figures 14 to 17), two sets of chiming buttons, indicated 57 and 58, are provided which produce the chime sequence of four and eight notes, as above noted. In the position shown in Figures 10 and 19, it will be observed that eight of the contact fingers 54 are in electrical contact with the conducting area 53 so as to energize eight of the striking contacts 56. It will be noted also that the cycle control gear is in a position to establish a circuit from the contact 60 to the stationary contact finger 61. This finger is electrically connected to the hour contact ring 63 of the chime energizing switch. As later described in detail in connection with the electrical system, a circuit is completed by way of contact finger 61 through the rotary motor control blade 64 of chime switch 45 to energize the motor 44. Upon rotation of the motor, the second or chime control switch blade 65 will rotate in unison with blade 64 in the direction indicated by the arrow in Figure 19 establishing a contact serially with the eight energized chime contacts, causing the Westminster sequence of notes to be sounded; following this, the blade 65 continues its rotary motion, successively contacting the striking contact buttons 56 to strike the hour.

Figure 20:
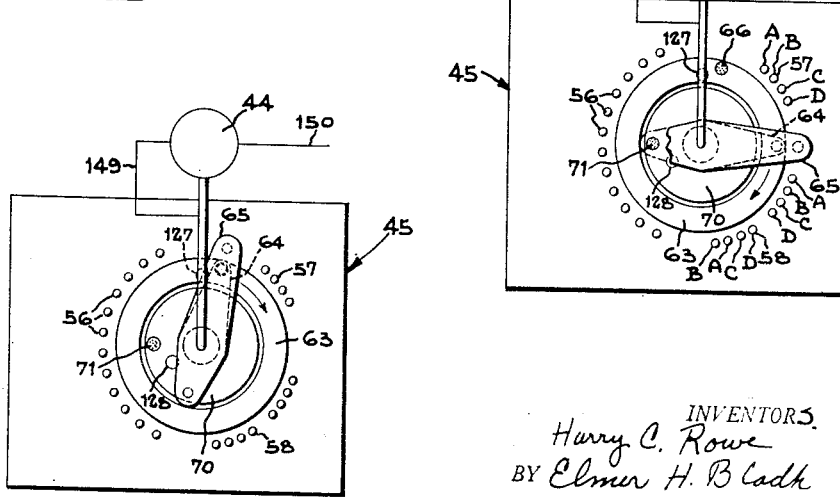
Figure 20 is a diagrammatic view showing the cycle control switch in its half-hour starting position, as distinguished from the hour position shown in Figure 19.

In the eight o'clock position shown, the first eight of these buttons are electrically connected together by way of the conducting area 53 to complete the circuit to one of the chimes. The rotary blade 65 moves slowly over the chime and striking contacts and thus sounds the chime sequence at a given rate of speed, then the chimes remain silent for a short period while the blade 65 swings over the open space between the chiming contacts and striking contacts. As the blade continues, it contacts each striking contact in series to send an electrical impulse to the hour chime which is one of the four basic chimes. After contacting the eight energized contacts 56, the blade continues over the remaining deenergized contacts until it reaches its half-hour position, as shown in Figure 20, at which point it stops. Thus, the blade contacts all twelve of the striking contacts 56 upon each striking cycle but the apparatus is responsive only to the contacts which are energized by the stroke counter 42. In order to stop the blade at the half-hour position, the hour contact ring 63 is provided with an insulated button 66 (Figure 19) which opens the circuit of motor 44 which was previously closed by way of contact finger 61.

Motor 44 remains deenergized for the next half hour, then the half-hour contact finger 67 is contacted by the moving contact 68 of the cycle control gear 52. When contact 68 engages finger 67, a circuit is established to the half-hour contact disk 70 causing the striker motor 44 again to be energized. At this time, the rotating blades 64 and 65 are in the position shown in Figure 20 to complete a circuit through motor 44. The motor now drives the blade forwardly in the direction indicated, causing the blade 65 to traverse the four half-hour chime buttons 57, energizing the four chimes to indicate the half hour. After passing over these contacts, blade 64 encounters the half-hour insulating button 71 (Figure 20) which breaks the circuit and causes motor 44 to stop. The blade is now in the position indicated in Figures 15 and 19 ready to strike the hourly chime sequence and sound the next hour in the manner above outlined. It will be observed, therefore, that the rotary switch blades 64 and 65 in conjunction with the contact rings 63 and 70 provide hour and half-hour holding circuits, causing the blade to advance for approximately a quarter turn on the half hour and to advance the remaining three quarters on the hour, as determined by the cycle gear 52.

In addition to the contacting areas 53—53 for counting the strokes, the counter gear 51 is provided with a night muting ring 72 extending partially around its face. This ring also is contacted by a pair of collector fingers 54 and serves to complete the chiming circuit for the extent of the ring and to provide a period of silence during certain hours at night, as determined by the gap 73 in the ring. The circuit for this purpose is completed from one finger to the next and is broken when the fingers 54 occupy the interrupted portion of the ring which, in the present disclosure, extends from the twelve (midnight) portion of the counter to the six A. M. portion. The counter is set to bring this open portion of the ring into registry with the fingers after the clock strikes twelve at night, shutting off the chimes until six-thirty o'clock in the morning. However, if it is desired to continue striking the hours during this period, the silencing switch 33 can be tripped to the "on" position, in which position the fingers 54 engaging the ring 72 are short circuited by the closed switch.

As above noted, the counter gear 51 makes one revolution in twenty-four hours and, since the clock must strike from one to twelve during each twelve-hour period, the gear is provided with duplicate contacting areas 53 for day and night operation respectively. Since the cycle control gear 52 makes one revolution every two hours, there is provided duplicate contacts 60 and 68 placed at 180° apart, causing hourly contact with the finger 61 and half-hourly contact with finger 67, the two fingers being located 90° apart.

*Stroke counting and cycle control units*

Since the stroke counting and cycle control gears are driven from the clock gears, a brief description of the train is necessary for a full disclosure of the apparatus. As shown in Figure 10, the gear train 41 for driving the clock hands includes an hour gear 75, a minute gear 76, and a second gear 77 mounted concentrically upon the respective sleeves and spindles of the hands (not shown). The gear train is connected to the clock motor 40 by a driving pinion 78 mounted upon the motor shaft and meshing with the second gear 77 at a ratio to sweep the second hand around the clock face once per minute. The drive for the minute gear 76 is transmitted from second gear 77 by a pinion 79 fixed to and rotating in unison with the second gear 77. Pinion 79 meshes with an idler gear 80 carrying a pinion 81 meshing with the minute gear 76. The drive for the hour hand is transmitted from a resetting gear 82 frictionally engaged against the minute gear and of the same pitch diameter as the second gear 77. The second and minute gears have been partially broken away in the drawing to expose a portion of gear 82. This gear is fixed to the minute hand sleeve and, being in frictional engagement with the minute gear 76, transmits rotation of the minute gear by friction to the sleeve and permits resetting of the clock.

An idler gear 83 meshes with resetting gear 82 and carries upon its shaft a pinion 84 meshing with the hour gear 75. Idler gear 83 and pinion 84 together make one revolution every two hours and the cycle control gear 52 which is of the same pitch meshes with idler gear 83, thus making one revolution every two hours. As above noted, the resetting gear 82, being frictionally engaged against the minute gear, may be rotated relative to the minute gear in resetting the clock. For this purpose, there is provided a gear set (not shown) meshing with the gear 82 and connected to the resetting stem 35 for rotating gear 82 upon manual rotation of the stem. Upon rotation of gear 82 relative to minute gear 76, the idler gear 83 and pinion 84 are rotated to drive the hour gear 75, also driving the stroke counter gear 51 and cycle control gear 52. Since gear 82 is secured directly to the minute hand sleeve, the minute hand also is reset in synchronism with the hour hand. The balance of the gear train including minute gear 76, pinion 81, gear 80, pinion 79, and a second gear 77 remain stationary during resetting as is customary. Since the clock motor gear train does not form an essential part of the invention, the mounting arrangement for the clock hands and the resetting gears of the stem have been omitted from the disclosure. It is to be noted that the counter gear 51 and cycle control gear 52 are in constant mesh with the clock gear train for automatic adjustment in unison with the clock hands when the clock is reset.

The stroke counter gear 51 is formed from a dielectric material such as a commercial fiber base thermo-setting plastic. The conducting areas 53—53 and ring 72 consists of thin films of metal which are applied to the surface of the gear by plating or by applying the metal mechanically. Such deposition of metal may follow any one of several known methods and need not be disclosed in detail. Gear 51 is loosely journalled upon a stub shaft 86 secured upon the clock mounting plate 27, the conducting area 53 being relieved in the area surrounding the stub shaft as at 87 to insulate the conducting surfaces from the shaft. The areas 53—53 also are insulated from the muting ring 72 by the clearance area 88.

Figure 11:
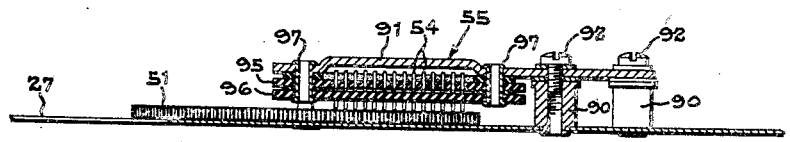
Figure 11 is a sectional view taken on line 11—11, Figure 10, detailing the collector assembly or comb in connection with the stroke counting unit.
Figure 12:
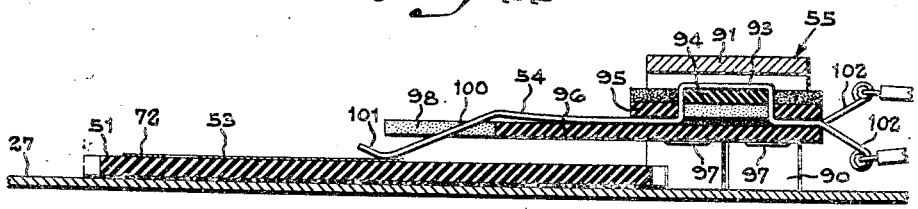
Figure 12 is a sectional view taken on line 12—12, Figure 10, illustrating the structural details of one of the collector fingers of the comb.

The comb assembly 55 is maintained alongside the gear 51 by means of spacer collars 90 which are riveted to the plate 27 as shown in Figures 11 and 12. The contact fingers 54 of the comb are mounted upon an overhanging bar 91 which is secured upon the spacers 90 by the screws 92 threaded into the spacers. The contact fingers 54 are bent from spring metal and are clamped in grouped formation upon the bar 91 in the manner shown in Figure 12. For this purpose, the rearward portion of each finger is configurated to provide an inverted U-shaped loop 93 passing over an insulating bar 94 with the horizontal portions of the finger passing under a second insulating bar 95. A third insulating plate 96 is disposed beneath the bar 95 and engaged in clamping relationship with the fingers to hold them firmly in position. The insulating members 94, 95 and 96 are clamped together and to the support bar 91 by the eyelets 97 (Figure 11).

As viewed in Figure 12, the lower insulating plate 96 extends laterally beyond the support bar 91 and overhangs the gear 51. The overhanging end of the plate is provided with slots 98 and the outer ends of the fingers are inclined downwardly as at 100, extending through the slots into contact with the surface of the gear under spring tension. These slots maintain the spaced relationship of the fingers to prevent electrical short circuits between them and to hold the fingers accurately in alignment with the corresponding steps 53a of the conducting areas 53. The contacting ends of the fingers are bent upwardly as at 101 to form an inclined leading end which is presented toward the direction of gear rotation, thus providing a rounded contacting surface. The rearward or clamped ends of the fingers extend angularly beyond the support bar 91 and the alternate fingers are bent at angles in opposite directions as at 102 to provide clearance for the electrical wires which are soldered to the ends of the fingers. These wires lead from the fingers to the striking contacts 56 of the rotary chime energizing switch 45, as indicated diagrammatically in Figure 19.

The interlacing of the contact fingers with the insulating bars 94, 95 and 96 secures the fingers rigidly in fixed endwise position and the slotted arrangement of plate 96 stabilizes the fingers laterally but provides the necessary resiliency at the contacting ends of the fingers. The structure is particularly convenient and inexpensive to fabricate and assemble and lends itself to mass production operations. The unit is assembled and the eyelets 97 clinched by the use of suitable fixtures and the assembled unit then is installed upon the base plate by applying the mounting screws 92. The unit is accessible at the rear of the clock by removing the rear panel and chime assembly and can be replaced readily if it becomes worn after a long period of service. The wires of the fingers extend to the striking contacts 56 of switch 45 by way of terminals which are mounted upon an insulating panel and urged under spring tension against the contact as disclosed hereinafter with reference to Figures 13 to 18.

The cycle control gear 52, which is also in electrical connection with the rotary chime energizing switch, is formed from a conducting material such as brass. This gear is loosely mounted upon a stub shaft 105 secured to the base plate 27. The contacts 60 and 68 carried by this gear are surrounded by an insulating washer 106 and electrical energy is applied to the gear from the transformer by way of the base plate 27 which is connected to the transformer as disclosed with reference to the electrical system. The contact fingers 61 and 67 which cooperate with the contacts 60 and 68 are formed from flat spring metal and are mounted above the gear so as to establish contact only when the contacts encounter the overhanging ends of the fingers. For electrical purposes, the respective fingers are clamped between insulating blocks 107 which are clamped by screws 108 passing into spacers similar to the spacers 90 previously described. This structure is similar to that shown in Figure 11 and therefore has not been illustrated in detail. The rearward ends of the contact fingers extend beyond the blocks 107 and wires leading to the switch 45 are soldered to the extended ends. As previously noted, gear 52 establishes an electrical circuit once every hour with the hour contact finger 61 and once every half hour with the half-hour finger 67 to energize motor 44 and start the chiming and striking cycles. The connection thus established is maintained for several minutes but this is immaterial because the rotary switch 45 by its own operation breaks the motor circuit after each hour or half-hour cycle.

Chime energizing switch

The chime energizing switch 45 is constructed as a self-contained detachable unit with its contacts and rotary blades enclosed between insulating panels to protect the electrical contacting surfaces from exposure to dust and dirt. Described with reference to Figures 13 to 18, the switch consists essentially of three insulating plates indicated at 110, 111 and 112 respectively. The motor 44 is secured upon the outer surface of plate 110 and the rotary contacting blades 64 and 65 are located within a circular recess 113 formed in the opposite side of the plate. The motor 44 preferably consists of a commercial clock motor having a gear reducer suitable to drive the blades at a relatively slow constant speed to provide uniformly spaced striking and chiming impulses during rotation.

Figure 13:
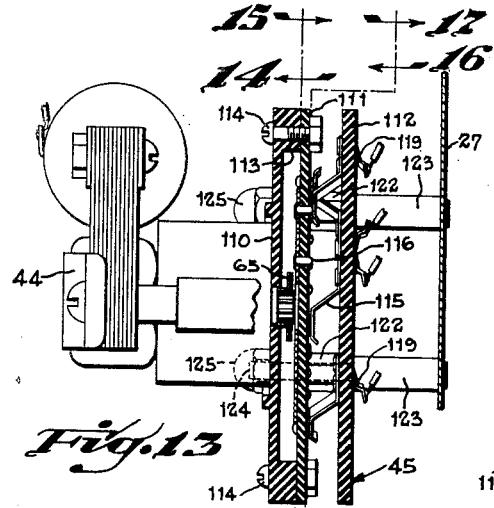
Figure 13 is a sectional view taken on line 13—13, Figure 9, detailing the rotary chime energizing switch.
Figure 14:
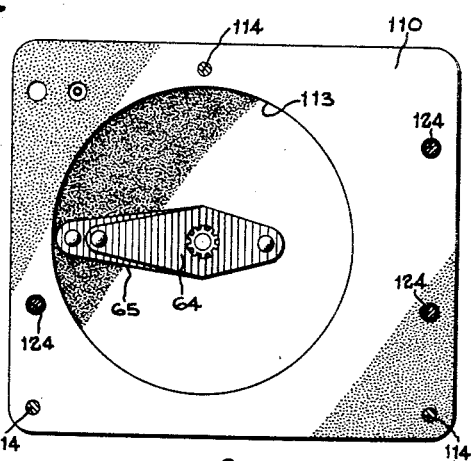
Figure 14 is a sectional view taken on line 14—14, Figure 13, illustrating the rotary switch blade of the chime energizing switch.
Figure 15:
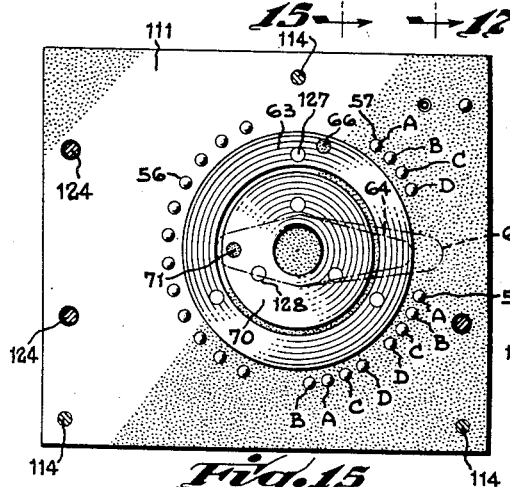
Figure 15 is a sectional view taken on line 15—15, Figure 13, illustrating the arrangement of contacts which are engaged by the rotary switch blade during rotation to energize the chimes.
Figure 16:
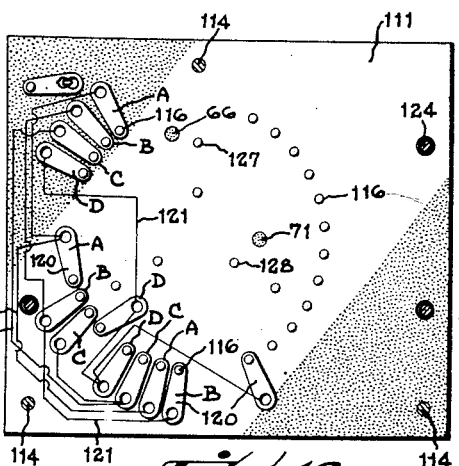
Figure 16 is a sectional view taken on line 16—16, Figure 13, illustrating the opposite side of the switch panel shown in Figure 15, particularly with reference to the interconnection of the chime operating contacts of the switch.
Figure 18:
Figure 18 is an enlarged sectional view taken on line 18—18, Figure 17, detailing the construction of one of the terminal arms shown in Figure 17.

The respective sets of striking and chiming contacts 56, 57 and 58, also, the hour ring 63 and half-hour disk 70, are mounted upon the contact panel 111 which is secured by screws 114 to the motor mounting panel 110. The rotary blades and their cooperating contacts thus are sealed off effectively against dirt and dust to preserve operating efficiency. The electrical circuit to the contacts 56, 57 and 58 and to the ring 63 and disk 70, is conducted by means of spring terminals 115 mounted upon the inner surface of terminal panel 112. These terminals are formed of flat spring metal and the contacts 55, 56 and 57 include shanks 116 passing through the panel 111 and engaged by the terminal springs (Figures 13 and 16). The terminal springs 115 are mounted upon their panel 112 by means of eyelets 117 passing through the strips having their heads seated against the base portion 118 of the strips and having their curled ends engaged upon soldering lugs 119 (Figure 18). To each lug 119 of the terminal springs which engage the striking contacts 56, there is soldered a wire leading to one of the collector fingers 54 of the stroke counting comb 55. Additional wires leading from the chimes, the transformer, and the contact fingers 61 and 67 of the cycle control unit to respective terminal springs 115 are disclosed more clearly in the electrical circuit diagrammed in Figure 19. The chiming contacts 57 and 58 also include lugs 120 which are interconnected with one another by the wires 121 to provide the desired chime sequences. Certain of these contacts are engaged by four of the spring terminals 115 to complete the circuit to the chime solenoid, as hereinafter disclosed.

The plate 112 is spaced from plate 111 by means of spacers 122 and the assembly is mounted in face-to-face relationship upon the base plate 27 by spacers 123 riveted or otherwise secured to the plate. The spacers 123 include studs 124 passing through the respective plates and the assembly is secured in position by acorn nuts 125 threaded upon the studs. In this position, the several terminal springs 115 are in electrical contact with their respective contacts; thus, by completing the circuit through the terminal springs, the switch assembly 45 including the motor 44 can be detached bodily from the panel 112.

Figure 17:
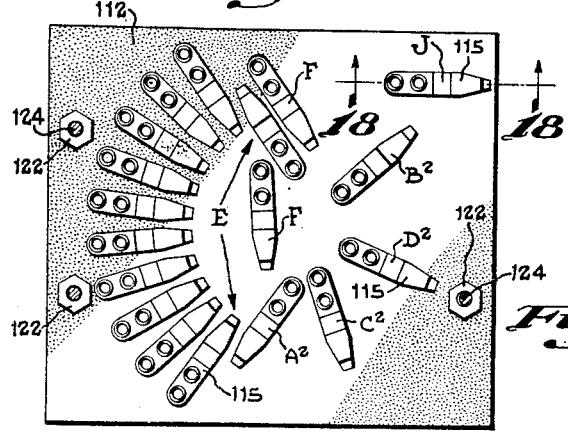
Figure 17 is a sectional view taken on line 17—17 looking toward the terminal plate of the switch to illustrate the arrangement of terminals by which the electrical circuit is conducted from the contacts of the switch to the control circuit and to the chimes.

As above noted, the chiming impulses are conducted from the contacts 57 and 58 to the chime solenoids by the spring terminals 115 which are arranged to contact certain individual contacts of the sets to carry the impulses to the four chime solenoids. As shown in Figure 17, there is provided a group of four terminal springs which are electrically connected to the four chime solenoids when the panel 112 is placed against the contact panel 111 shown in Figure 16. It will be noted that the panel 112 will be turned face down from the position shown in Figure 17 when placed in assembly with the contact panel 111 so that the positions of the terminal springs will be reversed.

In order to disclose the cooperating relationship of the contacts with the terminal springs and associated chime solenoids, the four individual contacts of the two sets of group 58 and the individual four contacts of group 57 are indicated respectively at A, B, C and D. The four contacts of each group are in electrical connection individually with the four chime solenoids and for purposes of identification, the corresponding solenoids are designated at $A^1$, $B^1$, $C^1$, and $D^1$ in Figure 19. These solenoids are not connected directly to the contacts but through the medium of the four terminal springs 115, each of which is connected to one of the four solenoids and with one of the corresponding contacts of each set. In order to identify the terminal springs 115 with the contacts and solenoids which they interconnect, the terminals are designated respectively at $A^2$, $B^2$, $C^2$ and $D^2$. The conductors for the solenoids extend from these respective spring terminals to the chime solenoids, as shown in Figure 19.

The interconnection between the individual contacts of each set (Figure 16) is such that one contact of each set is connected with a corresponding contact of the other two groups. Therefore, any one of these three common contacts upon being engaged by the rotary blade 65 will sound the same chime. The interconnection is repeated for the four individual contacts of each set so that all four chimes are sounded upon passage of the blade of any given set of four contacts. In the example shown in Figure 16, the contacts of the half-hour contact set 57 are interconnected with the adjacent contacts of set 58 in the same order and the next set of contacts 58 are interconnected in a different order. The relationship of the contacts with respect to one another can be ascertained readily by inspecting the sequence of letters A to D for the respective sets without tracing the several electrical circuits established by the lines 121.

When the rotary blade swings around the contacts, starting with the first contact of the hour set 58 in the direction indicated in Figure 19, the chimes energized by the first set are struck individually in a given order and the chimes of the second set 58 in a different order. In the Westminster chime sequence disclosed, the contacts of the first set sound the notes in a descending scale and the second set sounds the notes in an ascending scale except that the last two notes are struck in reverse order. It will be apparent, of course, that any desired sequence can be arranged by changing the leads 121 which interconnect the three sets.

After the hour chime sequence, the impulses are conducted from the individual hour striking contacts 56 by way of the spring terminals 115 which are arranged to contact individually the shank of each striking contact. This group of spring terminals is identified by the letter "E" in Figures 17 and 19. The spring terminals are connected electrically to the collector fingers 54, as shown in Figure 19, so that a number of contacts corresponding to the hour are connected together through the conducting area 53; the number of contacts being determined by the position of the area 53. One of the lines from the first finger 54 is connected to the solenoid of chime A¹ so that all the collector fingers, terminals and striking contacts are in common connection with solenoid A¹, causing this chime to be energized repeatedly to indicate the hour as determined by the number of energized contacts 56.

The circuit from the cycle control fingers 61 and 67 is conducted to the hour contact ring 63 and half-hour contact disk 70 by way of the spring terminals 115 which are indicated at F (Figures 16 and 19). For this purpose, the ring and disk are provided with contacts 127 and 128, the ends of which are exposed to the respective F terminals. These terminals are in electrical connection with the respective contact fingers 61 and 67 and thereby complete the circuit at the hour and half hour through the ring 63 or disk 70 by way of the contact fingers 64 or 65. The circuit for these spring terminals also is disclosed more completely in the electrical system disclosed in Figure 19.

*Chime unit*

As shown in Figures 1, 2 and 4, the base plate 46 of the chime assembly 25 is mounted upon the rear panel 24 by the screws 129 and the panel is secured to the clock case by screws 130. The electrical impulses from the chime energizing switch are conducted to the chime solenoids 50 by way of wires as diagrammed in Figure 19. The separable junction block 28 is interposed in the wires so that the electrical connections may be uncoupled without disturbing the soldered connections. The power circuit from the transformer 29, which is mounted in the clock case, also is completed through the junction block. The structural details of the junction block are disclosed most clearly in Figures 6, 7 and 8. As shown, a fixed block 131 is permanently secured by spacer rivets 132 to the base plate 46 and is provided with contacts 133 to which the solenoid wires are soldered. The detachable block 134 is provided with a series of spring terminals 135 to which the cables leading to the control switches are soldered. When the two blocks are placed in face-to-face relationship, the spring terminals engage the contacts to complete the various circuits and the blocks are secured in assembly by the screws 136.

As shown in Figures 2, 3 and 4, the resonator tubes 47—47 are mounted upon the base plate 46 by means of screws 137 and the tone bars 48 are mounted upon the resonator tubes by the spacers 138. Cushion washers 139 are placed between the tone bars and spacers to prevent damping of variations. In order to provide a compact structure, the tone bars are overlapped at their inner ends, thus permitting the use of bars of substantially greater length than would otherwise be possible. Each resonator tube includes a respective aperture 140 facing the individual tone bars and the tubes are divided by an intermediate partition to form air columns corresponding to the vibration frequency of the tone bars for resonance. The solenoids 50 are secured upon the base plate 46 in position to cause their respective armatures to strike the tone bars. As above noted, the solenoids are energized individually upon operation of the energizing switch 45 for the hour and half-hour chimes, and in striking the hours, a succession of notes is sounded by a single solenoid of the group.

*Electrical system*

As shown in Figure 19, the low voltage power supply for the electrical system is produced by the transformer 29 having its primary winding energized by the A. C. supply lines 141. The low voltage lines 142 and 143 extend from the secondary winding through the junction block 28 to the main control circuit. The clock motor 40 is connected directly across the lines 142 and 143 for continuous operation and the line 142 extends to the cycle control gear 52 through the base plate 27 as previously described, the line 144 representing the base plate.

Since the striking and chiming circuit is arranged to be shut down automatically at night, the operating circuit for the system is completed to the chime solenoids from line 143 by way of line 145 extending to the right hand contact finger 54 which is indicated at G. The circuit is completed through the muting ring 72 to the adjacent contact finger which is indicated at H. From finger H the circuit is completed in common to one side of the solenoid windings by way of line 146 through the junction block 28 to the line 147 to which the terminals of all four solenoids are connected in common. Thus, a circuit is established from one side of the secondary winding through the muting ring to all the solenoid windings; the circuit to the opposite ends of the windings being completed through the striking and chime energizing switches as hereinafter disclosed. If it is desired to continue striking during the night hours the muting switch 33 is closed, thereby bypassing the muting ring and maintaining the circuit from line 143, switch 33, line 146 to line 147, which is in connection with the solenoids.

The circuit for striking and chiming is completed from transformer line 142 to cycle control gear 52, and in the hour position shown, from gear 52 to finger 61 and from finger 61 by way of line 148 to the spring terminal F which, in turn, is electrically connected to the hour ring 63 as previously described. From the hour ring the circuit is completed through blade 64, line 149, through motor 44, and by way of line 150 to spring terminal J which is connected to the power line 143. The low voltage for driving the motor 44 through its cycle of operation thus extends from the transformer line 142 through gear 52, finger 61, line 148, ring 63 through the motor and back to the other side of the transformer by way of lines 150 and 143. The motor 44 will continue driving the blades 64 and 65 in the direction indicated in Figure 19 until blade 64 contacts the insulating button 66 to break the circuit. This causes the motor to stop with the blade in the half-hour position shown in Figure 20.

During the advancement of blade 65 from the hour striking position shown in Figure 19, blade 65, which rotates in unison with blade 64, will establish contact individually with the two sets of hour chiming contacts. The circuit for energizing the chime solenoid is completed from transformer line 142 through the cycle control gear 52 to the hour ring 63 and by way of blades 64 and 65 through the contacts 58 to the spring terminals $A^2$ to $D^2$ to sound the eight note hour chime. As the contacts are successively energized, the circuit is completed to the spring terminals in the order described with reference to the chime energizing switch and the circuit is completed from the spring terminals by way of lines 151 which lead to the terminals of the individual chime solenoids. Since the opposite terminals of the solenoids are connected in common to the energized line 147, through the muting ring 72 to the transformer line 143, the respective solenoids will be energized momentarily for each engagement of the eight chime contacts 58.

After striking the chimes, the blade 65 successively passes over the striking contacts 56 which are connected to the spring terminals E. These terminals are in electrical connection by way of the lines 152 leading from the spring terminals to the individual hour counting fingers 54 engaging the conducting area 53 so that in the position shown, the first eight terminals and their contacts 56 are in common electrical connection by way of the conducting surface 53. This position corresponds to the eight o'clock striking position with the result that the chime solenoid $A^1$ will be energized eight times as the blade 65 contacts the first eight contacts 56.

The circuit for hour striking is established from transformer line 142 through the cycle control gear 52 as previously described, and from the hour ring 63 through the blades 64 and 65. From the blade 65, the impulses are conducted to the contacts 56, and from their spring terminals E individually to the lines 152 to the conducting area 53. From the conducting area, the circuit extends by way of the left hand finger 54 designated at K to the line 151 which connects to solenoid $A^1$ to energize the solenoid successively for the eight strokes. After this operation, the motor 44 continues to run and the blade 65 successively engages the remaining contacts 56, but since the collector fingers 54 for these contacts are resting upon the insulating surface of gear 52, the circuit to these contacts is open and the solenoid remains deenergized. The motor will, of course, continue to run until the blade 64 encounters the insulating button 66 to break the motor circuit.

The blade now remains at rest in the position shown in Figure 20 until the half-hour contact finger 67 is energized upon advancement of the cycle control gear 52 to the half-hour chiming position. This circuit is the same as previously described for the hour strike, extending from transformer line 142, gear 52 to finger 67. From finger 67 the circuit is completed by way of line 153 to the terminal F which is connected to the half-hour disk 70 by way of contact 128, as previously described in connection with the chime energizing switch. In the position shown in Figure 20, blade 65 is in electrical connection with disk 70 so as to complete the circuit through motor 44 by way of line 149 and back to the opposite terminal of the transformer by way of line 150, terminal spring J, to transformer line 143. As the motor advances, blade 65 will successively engage the half-hour contacts 57 (A to D) which are connected individually to the terminals $A^2$ to $D^2$ as previously described. The circuit thus is completed from these terminals by way of the lines 151 to sound the four half-hour chime notes. After passing over the half-hour contacts 57 the motor 44 will continue rotating the blades until blade 65 encounters the insulating button 71 to break the circuit. At this point the blade remains in the stationary position shown in Figure 19 ready to chime and strike the hour when the hour contact finger 61 is again energized by the cycle control gear 52 upon advancement of the clock movement to the next hour position.

From the foregoing description of the cycle control gear and the half-hour and hour cycle control ring 63 and 70, it will be observed that motor 44 establishes its own holding circuit once it is energized for a sufficient period to advance the blades 64 and 65 from the respective insulating buttons 63 and 71 at the hour and half-hour stopping positions. Thus, the function of the cycle control gear is simply to start the motor 44 at proper time intervals and for a sufficient time period to complete the striking and chiming circuits through either the ring 63 or 70. For this purpose the cycle control contacts remain in contact for several minutes so as to open after the striking and chiming operation is completed. After completion of the cycle the motor 44 is deenergized automatically, even though the cycle control gear maintains the circuit for a longer period.

The volume control rheostat 30 is inserted in the line 146 as indicated in Figure 19 which extends to line 147. Adjustment of the rheostat thus alters the resistance in the circuit and controls the volume of all the chimes of the group.

Having described our invention, we claim:

1. In a time indicating clock movement, an electrical apparatus driven by the clock movement to strike the hours and sound a chime sequence comprising, an hour counting switch driven by the clock movement consisting of a gear having two electrical conducting areas on one of its surfaces, a group of twelve contact fingers adapted to establish electrical contact in common with said electrical conducting surfaces whereby the fingers are interconnected with one another in increasing numbers corresponding to the hours, a plurality of electrically operated chimes, a power circuit having one side connected to said chimes in common, a chime energizing switch having a plurality of striking contacts arranged to be interconnected by the contact fingers of the hour counting switch, one of said contacts being connected to the opposite side of one of the said chimes to strike the hours, a rotary contactor in the energizing switch connected to the opposite side of the power circuit and adapted to engage the striking contacts to energize the said chime in accordance with the number of contacts interconnected by the hour counting switch and thereby to strike the hour, an electric motor connected to the rotary contactor for rotating the same with respect to the striking and chiming contacts, a cycle control switch consisting of a gear meshing with the clock movement and adapted to make one revolution each hour, the gear having a pair of contacts cooperating with a pair of stationary contactors, said contactors connected to the said electric motor and arranged to energize the motor at hour and half hour intervals, a plurality of chiming contacts in the said chime energizing switch connected individually to the opposite side of said electrically operated chime units to complete the circuit therethrough, the said rotary contactor being adapted to engage sequentially the chime contacts to energize the chimes individually prior to engagement with the striking contacts whereby a chime sequence is sounded in advance of the hour strokes.

2. In an electrically operated hour chiming clock having a clock movement, a plurality of electrically operated chimes adapted to be energized selectively on the hour and half hour, a chime energizing switch having contacts arranged in an arc and in electrical connection with the individual chime units for energizing the same in sequence, a rotary contactor arranged to engage and energize the chime contacts successively, a switch motor for rotating the said rotary contactor, a cycle control gear in driving connection with the clock movement, a pair of contact fingers mounted alongside said gear, a pair of contacts on said gear adapted to engage said contact fingers as the gear rotates, the contact fingers being in electrical connection with the switch motor and arranged to energize the switch motor at the hour and half hour intervals, contact rings in the chime energizing switch constructed and arranged to complete the circuit from the cycle control switch to the switch motor, the said contact rings having insulating members engageable by the rotary contactor to deenergize the motor circuit after each hour and half hour movement of the rotary contactor.

3. In an electrically operated hour striking clock having a clock movement and an electrically operated chime unit arranged to sound the hours, an hour counting switch in driving connection with the clock movement comprising, a gear meshing with the clock movement and adapted to complete one revolution in twenty-four hours, a pair of electrical conducting areas on said gear, a series of contacts corresponding to the number of hours to be struck, each of the said areas being configurated to interconnect the contacts progressively together to determine the hour strokes every twelve hours, a muting ring formed of electrical conducting material disposed upon said gear in operating relationship with the said hour counting areas, a pair of contactors engaged upon the muting ring and arranged to complete the electrical circuit to the chiming unit, the said muting ring being interrupted at one portion thereof to open the circuit to the chime unit to silence the chime unit during certain hours as determined by the position of the said interrupted portion relative to the counting areas, and a switch interconnecting the said contacts and arranged to complete the circuit normally completed by the muting ring to provide operation of the chimes during the muting period.

4. An hour counting switch comprising, a gear adapted to be meshed in driving connection with the clock movement, the said gear having conducting areas formed thereon and configurated to determine the number of hour strokes, a plurality of elongated flexible contact fingers adapted to engage the said conducting areas, the rearward ends of the contact fingers being mounted collectively in clamping engagement between a plurality of superposed insulating panels adapted to be anchored alongside the said gear with the fingers overhanging the gear, in position to engage said conducting areas, the lowermost of said panels being extended laterally to overhang the gear and having a series of slots formed in its overhanging end, the said contact fingers being confined laterally within the said slots with their free ends resting upon the said gear.

5. An hour counting switch comprising, a gear adapted to be meshed in driving connection with a clock movement, the said gear being formed of dielectric material and having conducting areas formed thereon configurated to determine the number of hour strokes, a plurality of elongated contact fingers adapted to engage the said conducting areas, said contact fingers being formed of resilient wires, the rearward ends of said wires being mounted collectively in clamping engagement alongside the said gear with the forward ends of the wires overhanging the gear, the rearward portion of each wire being of U-shape configuration, a pair of interlocking panels, one of the panels being disposed within the U-shape configuration and the other straddling the same, and a base panel disposed beneath the wires, the said pair of interlocking panels being in clamping engagement upon the base panel to secure the configurated portions of the wires, the base panel being extended laterally to overhang the gear and having a series of slots formed in its overhanging end, the forward ends of the wires being confined laterally within the said slots with their free ends resting upon the said gear.

6. A motor driven chime energizing switch comprising a contact panel having a plurality of contacts, a motor mounting panel, a switch motor mounted upon one side of the panel, a rotary contactor disposed upon the opposite side of the motor panel and connected to the said motor, the rotary contactor being adapted to engage the said contacts, the said contact and motor panels being disposed in facial engagement with the said contacts and rotary contactor enclosed therebetween, the motor mounting and contact panels being secured together to provide a sealed unit which may be detached as a unit for replacement.

7. An hour counting switch comprising, a contact panel having a plurality of contacts mounted thereon, a motor mounting panel, a switch motor mounted upon one side of the panel, a rotary contactor disposed upon the opposite side of the panel and connected to the said motor, the rotary contactor being adapted to engage the said contacts, with the said contact and motor panels secured in facial engagement with one another to provide a sealed unit, the contacts of the contact panel having extensions passing through and exposed upon the opposite side of the contact panel, a terminal panel having a plurality of terminal springs adapted to engage the extensions of the contacts, and a base plate, the said terminal panel being mounted upon the base plate and the motor mounting and contact panel unit being detachably mounted upon the terminal panel.

HARRY C. ROWE.
ELMER H. BLADH.

(References on following page)

References Cited in the file of this patent

UNITED STATES PATENTS

| Number | Name | Date |
|---|---|---|
| Re. 21,370 | Alexander | Feb. 20, 1940 |
| 1,007,232 | Palmer | Oct. 31, 1911 |
| 1,322,216 | Adams et al. | Nov. 18, 1919 |
| 1,398,972 | Little | Dec. 6, 1921 |
| 1,983,236 | Little | Dec. 4, 1934 |
| 2,097,487 | Kinnear | Nov. 2, 1937 |
| 2,307,104 | Bossard | Jan. 5, 1943 |
| 2,363,859 | Gangemi | Nov. 28, 1944 |

FOREIGN PATENTS

| Number | Country | Date |
|---|---|---|
| 161,381 | Great Britain | Apr. 14, 1921 |
| 202,516 | Great Britain | Aug. 23, 1923 |
| 36,808 | France | Apr. 29, 1930 |
| 817,652 | France | May 31, 1937 |